United States Patent
Hou et al.

(10) Patent No.: US 11,973,226 B2
(45) Date of Patent: Apr. 30, 2024

(54) CAPACITOR-ASSISTED ELECTROCHEMICAL DEVICES HAVING HYBRID STRUCTURES

(71) Applicant: GM GLOBAL TECHNOLOGY OPERATIONS LLC, Detroit, MI (US)

(72) Inventors: Mengyan Hou, Shanghai (CN); Haijing Liu, Shanghai (CN); Qili Su, Shanghai (CN); Xiaochao Que, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 818 days.

(21) Appl. No.: 17/084,782

(22) Filed: Oct. 30, 2020

(65) Prior Publication Data
US 2021/0135224 A1    May 6, 2021

(30) Foreign Application Priority Data
Nov. 1, 2019    (CN) .......................... 201911059456.4

(51) Int. Cl.
H01M 10/18    (2006.01)
H01M 4/62    (2006.01)
(Continued)

(52) U.S. Cl.
CPC ........... *H01M 4/62* (2013.01); *H01M 50/531* (2021.01); *H01M 2004/029* (2013.01)

(58) Field of Classification Search
CPC .. H01M 50/514; H01M 50/51; H01M 50/512; H01M 50/531; H01M 50/534;
(Continued)

(56) References Cited

U.S. PATENT DOCUMENTS 10,297,885 B2    5/2019    Gayden et al.
11,349,119 B2    5/2022    Halalay et al.
(Continued)

FOREIGN PATENT DOCUMENTS

CN    1265534 A    9/2000
CN    109411811 A    3/2019
(Continued)

OTHER PUBLICATIONS

Lu, Yong et al., U.S. Appl. No. 16/661,364, filed Oct. 23, 2019 entitled, "Electrochemical Cells Including Sulfur-Containing Capacitors," 61 pages.
(Continued)

*Primary Examiner* — Raymond Alejandro
(74) *Attorney, Agent, or Firm* — Harness, Dickey & Pierce, P.L.C.

(57) ABSTRACT

A hybrid electrochemical device including at least two electrically connected solid-state electrochemical cells is provided. Each electrochemical cell includes a first outer electrode having a first current collector and a first electroactive layer, a second outer electrode having a second current collector and a second electroactive layer, and one or more intervening electrodes disposed between the electroactive layers. At least one of the intervening electrodes includes one or more capacitor additives. The first outer electrode is electrically connected to at least one of the intervening electrodes in a first electrical configuration. The second outer electrode is electrically connected to at least one of the intervening electrodes in a second electrical configuration. The at least two electrochemical cells are electrically connected in a third electrical configuration. The first and second electrical configurations are the same and the third electrical configuration is distinct from the first and second electrical configurations.

20 Claims, 5 Drawing Sheets

(51) Int. Cl.
*H01M 50/531* (2021.01)
*H01M 4/02* (2006.01)

(58) Field of Classification Search
CPC .. H01M 50/54; H01M 50/569; H01M 50/258; H01M 10/0562; H01M 12/00; H01M 4/62; H01M 2004/029
See application file for complete search history.

(56) References Cited

U.S. PATENT DOCUMENTS

| | | | |
|---|---|---|---|
| 11,651,906 | B2 | 5/2023 | Su et al. |
| 11,721,843 | B2 | 8/2023 | Kong et al. |
| 11,784,010 | B2 | 10/2023 | Kong et al. |
| 2007/0212604 | A1 | 9/2007 | Ovshinsky et al. |
| 2010/0273035 | A1 | 10/2010 | Kim |
| 2014/0212751 | A1 | 7/2014 | Ku et al. |
| 2014/0272477 | A1 | 9/2014 | West et al. |
| 2016/0308243 | A1* | 10/2016 | Herle .................. H01M 4/1391 |
| 2016/0365613 | A1* | 12/2016 | Fan ........................ H01G 11/56 |
| 2018/0034094 | A1 | 2/2018 | Liu et al. |
| 2018/0233752 | A1* | 8/2018 | Herrmann ........... H01M 50/121 |
| 2018/0287164 | A1 | 10/2018 | Liu et al. |
| 2019/0061555 | A1 | 2/2019 | Liu et al. |
| 2019/0067754 | A1 | 2/2019 | Gu et al. |
| 2019/0074510 | A1 | 3/2019 | Zhang et al. |
| 2019/0157659 | A1 | 5/2019 | Liu et al. |
| 2019/0190012 | A1 | 6/2019 | Wu et al. |
| 2019/0341648 | A1 | 11/2019 | Wu et al. |
| 2019/0372127 | A1 | 12/2019 | Li et al. |
| 2019/0372186 | A1 | 12/2019 | Kong et al. |
| 2019/0393569 | A1 | 12/2019 | Rich et al. |
| 2020/0036053 | A1 | 1/2020 | Li et al. |
| 2020/0036070 | A1 | 1/2020 | Li et al. |
| 2020/0119339 | A1 | 4/2020 | Halalay et al. |
| 2021/0065992 | A1 | 3/2021 | Lu et al. |
| 2021/0110979 | A1 | 4/2021 | Que et al. |

FOREIGN PATENT DOCUMENTS

| | | |
|---|---|---|
| CN | 112768811 A | 5/2021 |
| DE | 102020126728 A1 | 5/2021 |
| JP | H117983 A | 1/1999 |
| WO | 2018132992 A1 | 7/2018 |
| WO | 2019200609 A1 | 10/2019 |
| WO | 2019204964 A1 | 10/2019 |
| WO | 2019218327 A1 | 11/2019 |

OTHER PUBLICATIONS

Kong, Dewen et al., U.S. Appl. No. 16/685,389, filed Nov. 15, 2019 entitled, "Capacitor-Assisted Gradient Electrodes," 71 pages.

First Office Action for Chinese Patent Application No. 201911059456.4 issued on Jan. 9, 2024, with correspondence from China Patent Agent (H.K.) Ltd. summarizing Office Action; 7 pages.

* cited by examiner

CAPACITOR-ASSISTED ELECTROCHEMICAL DEVICES HAVING HYBRID STRUCTURES

CROSS-REFERENCE TO RELATED APPLICATIONS

This application claims the benefit and priority of Chinese Patent Application No. 201911059456.4, filed Nov. 1, 2019. The entire disclosure of the above application is incorporated herein by reference.

INTRODUCTION

This section provides background information related to the present disclosure which is not necessarily prior art.

The present disclosure pertains to solid-state electrochemical cells including one or more capacitor additives and to hybrid electrochemical devices including the solid-state electrochemical cells and having concurrent serial and parallel electrical connections.

Advanced energy storage devices and systems are in demand to satisfy energy and/or power requirements for a variety of products, including automotive products such as start-stop systems (e.g., 12V start-stop systems), battery-assisted systems, Hybrid Electric Vehicles ("HEVs"), and Electric Vehicles ("EVs"). Typical lithium ion batteries include at least two electrodes and an electrolyte and/or separator. One of the two electrodes serves as a positive electrode or cathode and the other electrode serves as a negative electrode or anode. A separator and/or electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte, the solid-state electrolyte may physically separate the electrodes so that a distinct separator is not required.

Many different materials may be used to create components for a lithium-ion battery. For example, positive electrode materials for lithium batteries typically comprise an electroactive material which can be intercalated or reacted with lithium ions, such as lithium-transition metal oxides or mixed oxides, for example including $LiMn_2O_4$, $LiCoO_2$, $LiNiO_2$, $LiMn_{1.5}Ni_{0.5}O_4$, $LiNi_{(1-x-y)}Co_xM_yO_2$ (where $0<x<1$, $y<1$, and M may be Al, Mn, or the like), or one or more phosphate compounds, for example including lithium iron phosphate or mixed lithium manganese-iron phosphate. The negative electrode typically includes a lithium insertion material or an alloy host material. For example, typical electroactive materials for forming an anode include graphite and other forms of carbon, silicon and silicon oxide, tin and tin alloys. Further, in various instances capacitors or super capacitors may be integrated into the battery to increase the power of lithium-ion electrochemical cells. For example, capacitors can provide high power density (e.g., about 10 kW/kg) in power-based applications.

Often, in a lithium-ion battery pack, batteries or cells may be electrically connected, for example in a stack, to increase overall output. For example, cells may be electrically connected in parallel or in series. Series configurations may increase module voltage and uniform current distribution within the pack. In certain instances, such series configuration may also reduce the volume and weight of the battery pack. Such serial configurations, however, may have limited capacity capabilities. The serial configuration increases only the voltage of the cell. In other instances, parallel configurations of the batteries or cells may form the pack. Parallel configurations may increase capacity within the pack. Such parallel configurations, however, may have limited voltage capability. The parallel configuration increases only the capacity of the cell. Accordingly, it would be desirable to develop electrochemical devices and systems having both enhanced voltage and capacity capabilities, as well as enhanced power capabilities and increased energy densities.

SUMMARY

This section provides a general summary of the disclosure, and is not a comprehensive disclosure of its full scope or all of its features.

In various aspects, the present disclosure provides a hybrid electrochemical device. The hybrid electrochemical device may include at least two electrically connected solid-state electrochemical cells. Each solid-state electrochemical cell includes a first outer electrode, a second outer electrode, and one or more intervening electrode. The first outer electrode includes a first current collector and a first electroactive layer disposed on or adjacent a first surface of the first current collector. The second outer electrode includes a second current collector and a second electroactive layer disposed on or adjacent a first surface of the second current collector. The one or more intervening electrodes may be disposed between the first electroactive layer and the first electroactive layer. At least one of the one or more intervening electrodes comprises one or more capacitor additives. The first outer electrode may be electrically connected to at least one of the one or more intervening electrodes in a first electrical configuration selected from series or parallel. The second outer electrode may be electrically connected to at least one of the one or more intervening electrodes in a second electrical configuration selected from series or parallel. The at least two electrochemical cells may be electrically connected in a third electrical configuration selected from series or parallel. The first and second electrical configurations may be the same. The third electrical configuration may be distinct from the first and second electrical configurations.

In one aspect, the first and second electrical configurations are series configurations and the third electrical configuration is a parallel configuration.

In one aspect, the one or more intervening electrodes may be bipolar electrodes. Each bipolar electrode may include a bipolar current collector, a second positive electroactive layer, and a second negative electroactive layer. The bipolar current collector may have a first surface opposing a second surface. The positive electroactive layer may be disposed on or adjacent a first surface of the bipolar current collector. The negative electroactive layer may be disposed on or adjacent a second surface of the bipolar current collector.

In one aspect, one of the positive electroactive layer and the second electroactive layer of at least a first bipolar electrode may include the one or more capacitor additives.

In one aspect, one of the positive electroactive layer and the negative electroactive layer of at least a first bipolar electrode may be a capacitor layer consisting essentially of the one or more capacitor additives.

In one aspect, greater than or equal to about 1 to less than or equal to about n−1 of the intervening electrodes includes the one or more capacitor additives, where n is a total number of intervening electrodes in the solid-state electrochemical cell.

In one aspect, one of the first and second electroactive layers includes the one or more capacitor additives.

In one aspect, the positive outer electrode, the negative outer electrode, and the one or more intervening electrodes may electrically connected in parallel and the at least two solid-state electrochemical cells may be electrically connected in a series.

In one aspect, the one or more intervening electrodes may be monopolar electrodes. Each monopolar electrode includes a third current collector having a first surface that opposes a second surface, a third electroactive layer disposed on or adjacent the first surface of the third current collector, and a fourth electroactive layer disposed on or adjacent the second surface of the third current collector.

In one aspect, one of the second and third electroactive layers includes the one or more capacitor additives.

In one aspect, one of the second and third electroactive layers consisting essentially of the one or more capacitor additives, and greater than or equal to about 1 to less than or equal to about n−1 of the intervening electrodes includes the one or more capacitor additives, where n is a total number of intervening electrodes in the solid-state electrochemical cell.

In one aspect, a solid-state electrolyte may be disposed between each of the positive outer electrode, the one or more intervening electrodes, and the negative outer electrode.

In various aspects, the present disclosure provides a hybrid electrochemical device. The hybrid electrochemical device includes at least two solid-state electrochemical cells. The at least two solid-state electrochemical cells may be electrically connected in series. Each of the at least two solid-state electrochemical cells may include a positive outer electrode, a negative outer electrode, at least one positive monopolar electrode, and at least one negative monopolar electrode. The positive outer electrode may include a first positive current collector and a first positive electroactive layer. The first positive electroactive layer may be disposed on or adjacent a first surface of the first positive current collector. The negative outer electrode may include a first negative current collector and a first negative electroactive layer. The first negative electroactive layer may be disposed on or adjacent a first surface of the first negative current collector. The at least one positive monopolar electrode may be disposed between the first positive electroactive layer and the first negative electroactive layer. The at least one positive monopolar electrode may be electrically connected to the positive outer electrode in parallel. The at least one negative monopolar electrode may be disposed with the at least one monopolar positive electrode between the first positive electroactive layer and the first negative electroactive layer. The at least one negative monopolar electrode may be electrically connected to the negative outer electrode in parallel. One of the at least one monopolar positive electrode and the at least one monopolar negative electrode includes a capacitor additive.

In one aspect, each positive monopolar electrode includes a second positive current collector, a second positive electroactive layer, and a third positive electroactive layer. The second positive current collector may have a first surface that opposes a second surface. The second positive electroactive layer may be disposed on the first surface of the second positive current collector. The third positive electroactive layer may be disposed on the second surface of the second positive current collector. Each negative monopolar electrode includes a second negative current collector, a second negative electroactive layer, and a third negative electroactive layer. The second negative current collector may have a first surface that opposes a second surface. The second negative electroactive layer may be disposed on or adjacent the first surface of the second negative current collector. The third negative electroactive layer may be disposed on or adjacent the second surface of the second positive current collector.

In one aspect, the one of the second positive electroactive layer, the second negative electroactive layer, the third positive electroactive layer, and the third negative electroactive layer includes the capacitor additive.

In one aspect, the one of the second positive electroactive layer, the second negative electroactive layer, the third positive electroactive layer, and the third negative electroactive layer may be a capacitor layer consisting essentially of the capacitor additive.

In various other aspects, the present disclosure provides a hybrid electrochemical device. The hybrid electrochemical device includes at least two solid-state electrochemical cells. The at least two solid-state electrochemical cells may be electrically connected in parallel to form the stack. Each of the at least two solid-state electrochemical cells includes a positive outer electrode, a negative outer electrode, and at least two bipolar electrodes. The positive outer electrode includes a first positive current collector and a first positive electroactive layer. The first positive electroactive layer may be disposed on or adjacent a first surface of the first positive current collector. The negative outer electrode includes a first negative current collector and a first negative electroactive layer. The first negative electroactive layer may be disposed on or adjacent a first surface of the first negative current collector. The at least two bipolar electrodes may be disposed between the first positive electroactive layer and the first negative electroactive layer. One of the at least two bipolar electrodes comprises a capacitor additive.

In one aspect, each bipolar electrode includes a bipolar current collector, a second positive electroactive layer, and a second negative electroactive layer. The bipolar current collector may have a first surface opposing a second surface. The second positive electroactive layer may be disposed on or adjacent a first surface of the bipolar current collector. The second negative electroactive layer may be disposed on or adjacent a second surface of the bipolar current collector.

In one aspect, a first bipolar electrode of the at least two bipolar electrodes includes the capacitor additive.

In one aspect, a first bipolar electrode of the at least two bipolar electrodes includes the capacitor additive.

In one aspect, one of the second positive electroactive layer and the second negative electroactive layer of the first bipolar electrode may be a capacitor layer consisting essentially of the capacitor additive.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to electrochemical cells including one or more capacitor additives that may be incorporated into energy storage devices, for example lithium-ion batteries, having hybrid structures, so as to integrate the voltage capabilities of serial electrical connections with the capacity capabilities of parallel electrical connections, and in various aspects, the high power density of capacitors with the high energy density of lithium-ion batteries. In various instances the electrochemical cells and devices may be used in, for example, automotive or other vehicles (e.g., motorcycles, boats). However, the described electrochemical cells and devices may also be used in a variety of other industries and applications, such as consumer electronic devices, by way of non-limiting example.

Typical lithium-ion batteries include a first electrode (such as a positive electrode or cathode) opposing a second electrode (such as a negative electrode or anode) and a separator and/or electrolyte disposed therebetween. The first and second electrodes are connected, respectively, to first and second current collectors (typically a metal, such as copper for the anode and aluminum for the cathode). The current collectors associated with the two electrodes are connected by an external circuit that allows current generated by electrons to pass between the electrodes to compensate for transport of lithium ions across the battery cell. For example, during cell discharge, the internal $Li^+$ ionic current from the negative electrode to the positive electrode may be compensated by the electronic current flowing through the external circuit from the negative electrode to the positive electrode of the battery cell. In various aspects, multiple lithium-ion battery cells may be electrically connected in an electrochemical device to increase overall output. For example, lithium-ion battery cells may be electrically coupled in a stack. Stacks often include positioning first and second current collectors and corresponding first and second electrodes in alternating arrangements with a separator and/or electrolyte disposed between the electrodes. The current collectors may be electrically connected in a serial or parallel arrangements.

For example, in accordance with various aspects of the present disclosure, a hybrid electrochemical device may comprise at least two capacitor-assisted, solid-state electrochemical cells that are electrically connected, for example in a stack. Each solid-state electrochemical cell may comprise a first or positive outer electrode and a second or negative outer electrode. The negative outer electrode may be parallel with the positive outer electrode. For example, a first surface of the positive outer electrode may oppose a first surface of the negative outer electrode. The positive outer electrode may comprise a first positive current collector and a first positive electroactive layer. The first positive electroactive layer may be disposed in electrical communication with the first positive current collector. For example, the first positive electroactive layer may be disposed on or adjacent the first surface of the first positive current collector. The negative outer electrode may comprise a first negative current collector and a first negative electroactive layer. The first negative electroactive layer may be disposed in electrical communication with the first negative current collector. For example, the first negative electroactive layer may be disposed on or adjacent the first surface of the first negative current collector.

One or more intervening electrodes may be disposed between the first positive electroactive layer and the first negative electroactive layer. As discussed in further detail below, in certain variations, the one or more intervening electrodes may be bipolar (series) electrodes and the at least two solid-state electrochemical cells may be electrically connected in a parallel configuration to form the stack. For example, each bipolar electrode may comprise a bipolar current collector having a first surface that opposes a second surface. A second positive electroactive layer may be disposed on or adjacent the first surface of the bipolar current collector, and a second negative electroactive layer may be disposed on or adjacent the second surface of the bipolar current collector. At least a first bipolar electrode of the one or more intervening electrodes may include the one or more capacitor additives. For example, in certain instances, one of the second positive electroactive layer and the second negative electroactive layer of the first bipolar electrode may include greater than or equal to about 0.1 wt. % to less than or equal to about 100 wt. % of the capacitor additive. In other variations, one of the second positive electroactive layer and the second negative electroactive layer of the first bipolar electrode may be a capacitor layer consisting essentially of the capacitor additive. In still other variations, one of the first positive electroactive layer and the first negative electroactive layer may comprise the one or more capacitor additives.

In other variations, also discussed below, the one or more intervening electrodes may be monopolar (parallel) electrodes and the at least two solid-state electrochemical cells may be electrically connected in a series configuration to form the stack. For example, the one or more intervening electrodes may comprise a first or positive monopolar electrode and a second or negative monopolar electrode. The positive monopolar electrode may comprise a second positive current collector having a first surface that opposes a second surface. A second positive electroactive layer may be disposed on or adjacent the first surface of the second positive current collector, and a third positive electroactive layer may be disposed on or adjacent the second surface of the second positive current collector. The negative monopolar electrode may comprise a second negative current collector having a first surface that opposes a second surface. A second negative electroactive layer may be disposed on or adjacent the first surface of the second negative current collector, and a third negative electroactive layer disposed on or adjacent the second surface of the second positive current collector. One of the positive monopolar electrode and the second monopolar electrode may include the capacitor additive. For example, in certain instances, one of the second positive electroactive layer, the second negative electroactive layer, the third positive electroactive layer, and the third negative electroactive layer comprises greater than or equal to about 0.1 wt. % to less than or equal to about 100 wt. % of the capacitor additive. In other variations, one of the second positive electroactive layer, the second negative electroactive layer, the third positive electroactive layer, and the third negative electroactive layer is a capacitor layer consisting essentially of the capacitor additive.

In each instance, separators or solid-state electrolytes are disposed between each of the positive end electrode, the one or more intervening electrodes, and the negative end electrodes. For example, the solid-state electrolyte physically separate and electrically isolated the positive end electrode, the one or more intervening electrodes, and the negative end electrodes. The current collectors connected in series or parallel may facilitate the flow of electrons between the electrodes and an exterior circuit.

Figure 1A:
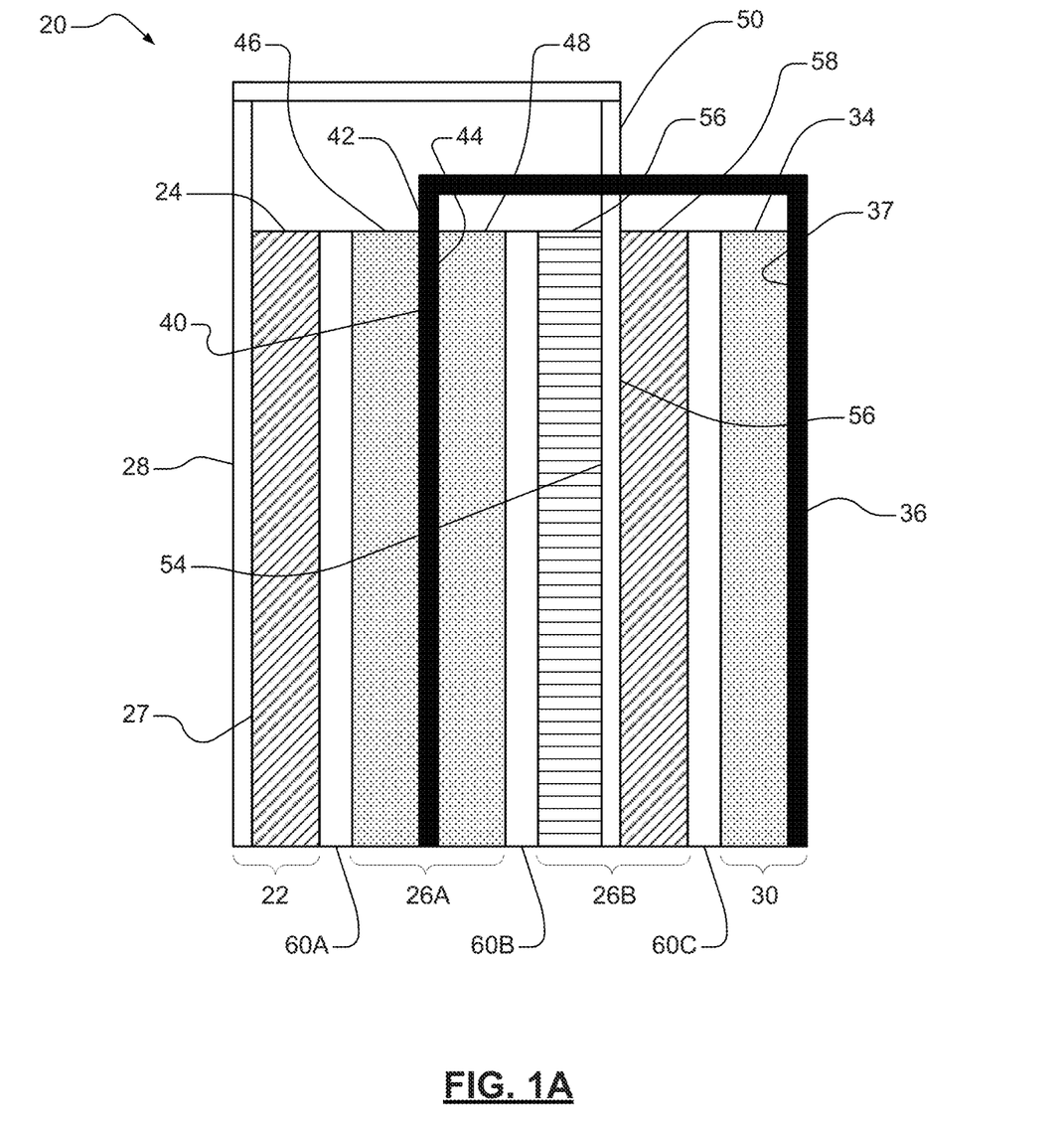
FIG. 1A is an example schematic illustration of a solid-state electrochemical cell having a parallel configuration and at least one electrode comprising a capacitor additive in accordance with various aspects of the present disclosure.

An exemplary and schematic illustration of a capacitor-assisted, solid-state electrochemical cell 20 is shown in FIG. 1A. The electrochemical cell 20 has a parallel configuration. For example, the electrochemical cell 20 may include outer electrodes 22, 30 that define the perimeter of the electrochemical cell 20 and a plurality of monopolar electrodes 26A, 26B disposed between the outer electrodes 22, 30. As illustrated, the electrochemical cell 20 may comprise a positive outer electrode 22 and a negative outer electrode 30, and at least two monopolar electrodes 26A, 26B disposed therebetween. One of the at least two monopolar electrodes 26A, 26B comprises one or more capacitor additives. For example, as illustrated, a first layer 56 of the second monopolar electrode 26B may comprise the one or more capacitor additives. The electrochemical cell 20 also includes a plurality of separators 60A, 60B, 60C that are disposed between the electrodes 22, 26A, 26B, 30. The separators 60A, 60B, 60C provide electrical separation—preventing physical contact—between the electrodes 22, 26A, 26B, 30. The separators 60A, 60B, 60C also provide minimal resistance paths for internal passage of ions. For example, a first separator 50A may be disposed between the positive outer electrode 22 and a first monopolar electrode 26A. A second separator 60B may be disposed between the first monopolar electrode 26A and a second monopolar electrode 26B. A third separator 60C may be disposed between the first monopolar electrode 26B and the negative outer electrode 30.

In various aspects, the separators 60A, 60B, 60C may each be formed by solid-state electrolytes. For example, the separators 60A, 60B, 60C may each include individual pluralities of one or more solid-state electrolyte particles (not shown). Each plurality of solid-state electrolyte particles may be disposed in one or more layers or composites so as to define a three-dimensional structure of respective separator 60A, 60B, 60C. For example, each separator 60A, 60B, 60C may have a thickness greater than or equal to about 1 μm to less than or equal to about 1 mm, and in certain aspects, optionally greater than or equal to about 5 μm to less than or equal to about 100 μm.

In various instances, the one or more solid-state electrolyte particles may comprise one or more polymer-based particles, oxide-based particles, sulfide-based particles, halide-based particles, borate-based particles, nitride-based particles, and hydride-based particles. For example, the polymer-based particles may comprise one or more of polymer materials selected from the group consisting of: poly(ethylene oxide) (PEO), poly(ethylene glycol) (PEG), polyethylene carbonate, poly(trimethylene carbonate) (PTMC), poly(propylene carbonate) (PC), polyethylene glycol, poly(p-phenylene oxide) (PPO), poly(methyl methacrylate) (PMMA), polyacrylonitrile (PAN), polyvinylidene fluoride (PVDF), poly(vinylidene fluoride-co-hexafluoropropylene) (PVDF-HFP), polyvinyl chloride (PVC), and combinations thereof.

The oxide-based particles may comprise one or more garnet ceramics, LISICON-type oxides, NASICON-type oxides, Perovskite-type ceramics, and antiperovskite-type ceramics. For example, the one or more garnet ceramics may be selected from the group consisting of: $Li_{6.5}La_3Zr_{1.75}Te_{0.25}O_{12}$, $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{6.12}Al_{0.25}La_3Zr_2O_{12}$, $Li_{6.75}La_3Zr_{1.75}Nb_{0.25}O_{12}$, $Li_{6.75}La_3Zr_{1.75}Nb_{0.25}O_{12}$, $Li_5La_3M_2O_{12}$ (where M is one of Nb and Ta), and combinations thereof. The one or more LISICON-type oxides may be selected from the group consisting of: $Li_{14}Zn(GeO_4)_4$, $Li_{3+x}(P_{1-x}Si_x)O_4$ (where $0<x<1$), $Li_{3+x}Ge_xV_{1-x}O_4$ (where $0<x<1$), and combinations thereof. The one or more NASICON-type oxides may be defined by $LiMM'(PO_4)_3$, where M and M' are independently selected from Al, Ge, Ti, Sn, Hf, Zr, and La. For example, in certain variations, the one or more NASICON-type oxides may be selected from the group consisting of: $Li_{1+x}Al_xGe_{2-x}(PO_4)_3$ (LAGP) (where $0≤x≤2$), $Li_{1+x}Al_xTi_{2-x}(PO_4)_3$ (LATP) (where $0≤x≤2$), $Li_{1+x}Y_xZr_{2-x}(PO_4)_3$ (LYZP) (where $0≤x≤2$), $Li_{1.3}Al_{0.3}Ti_{1.7}(PO_4)_3$, $LiTi_3$, $LiGeTi(PO_4)_3$, $LiGe_2(PO_4)_3$, $LiHf_2(PO_4)_3$, $LiTi_{0.5}Zr_{1.5})(PO_4)_3$, and combinations thereof. The one or more Perovskite-type ceramics may be selected from the group consisting of: $Li_{3.3}La_{0.56}TiO_3$, $LiSr_{1.65}Zr_{1.3}Ta_{1.7}O_9$, $Li_{2x-y}Sr_{1-x}Ta_yZr_{1-y}O_3$ (where $x=0.75y$ and $0.60<y<0.75$), $Li_{3/8}Sr_{7/16}Nb_{3/4}Zr_{1/4}O_3$, $Li_{3x}La_{(2/3-x)}TiO_3$ (where $0<c<0.25$), $Li_{0.5}M_{0.5}TiO_3$ (where M is one of Sm, Nd, Pr, and La), and combinations thereof. The one or more antiperovskite-type ceramics may be selected from the group consisting of: $Li_3OCl$, $Li_3OBr$, and combinations thereof. In each instance, however, the one or more oxide-based materials may have an ionic conductivity greater than or equal to about $10^{-5}$ S/cm to less than or equal to about $10^{-3}$ S/cm.

The sulfide-based particles may include one or more sulfide-based materials selected from the group consisting of: $Li_2S$—$P_2S_5$, $Li_2S$—$P_2S_5$-$MS_x$ (where M is Si, Ge, and Sn and $0≤x≤2$), $Li_{3.4}Si_{0.4}P_{0.6}S_4$, $Li_{10}GeP_2S_{11.7}O_{0.3}$, $Li_{9.6}P_3S_{12}$, $Li_7P_3S_{11}$, $Li_9P_3S_9O_3$, $Li_{10.35}Si_{1.35}P_{1.65}S_{12}$, $Li_{9.81}Sn_{0.81}P_{2.19}S_{12}$, $Li_{10}(Si_{0.5}Ge_{0.5})P_2S_{12}$, $Li(Ge_{0.5}Sn_{0.5})P_2S_{12}$, $Li(Si_{0.5}Sn_{0.5})P_sS_{12}$, $Li_{10}GeP_2S_{12}$ (LGPS), $Li_6PS_5X$ (where X is Cl, Br, or I), $Li_7P_2S_8I$, $Li_{10.35}Ge_{1.35}P_{1.65}S_{12}$, $Li_{3.25}Ge_{0.25}P_{0.75}S_4$, $Li_{10}SnP_2S^{12}$, $Li_{10}SiP_2S_{12}$, $Li_{9.54}Si_{1.74}P_{1.44}S_{11.7}Cl_{0.3}$, $(1-x)P_2S_5$-$xLi_2S$ (where $0.5≤x≤0.7$), and combinations thereof. The one or more sulfide-based materials may have an ionic conductivity greater than or equal to about $10^{-7}$ S/cm to less than or equal to about $10^{-2}$ S/cm.

The halide-based particles may include one or more halide-based materials selected from the group consisting of: $Li_2CdCl_4$, $Li_2MgCl_4$, $Li_2CdI_4$, $Li_2ZnI_4$, $Li_3OCl$, $LiI$, $Li_5ZnI_4$, $Li_3OCl_{1-x}Br_x$ (where $0<x<1$), and combinations thereof. The one or more halide-based materials may have an ionic conductivity greater than or equal to about $10^{-8}$ S/cm to less than or equal to about $10^{-5}$ S/cm.

The borate-based particles may include one or more borate-based materials selected from the group consisting of: $Li_2B_4O_7$, $Li_2O$—$(B_2O_3)$—$(P_2O_5)$, and combinations thereof. The one or more borate-based materials may have an ionic conductivity greater than or equal to about $10^{-7}$ S/cm to less than or equal to about $10^{-6}$ S/cm.

The nitride-based particles may include one or more nitride-based materials selected from the group consisting of: $Li_3N$, $Li_7PN_4$, $LiSi_2N_3$, LiPON, and combinations thereof. The one or more nitride-based materials may have an ionic conductivity greater than or equal to about $10^{-9}$ S/cm to less than or equal to about $10^{-3}$ S/cm.

The hydride-based particles may include one or more hydride-based materials selected from the group consisting of: $Li_3AlH_6$, $LiBH_4$, $LiBH_4$—LiX (where X is one of Cl, Br, and I), LiNH$_2$, Li$_2$NH, LiBH$_4$—LiNH$_2$, and combinations thereof. The one or more hydride-based materials may have an ionic conductivity greater than or equal to about 10$^{-7}$ S/cm to less than or equal to about 10$^{-4}$ S/cm.

In other variations, the plurality of separators 60A, 60B, 60C may each be formed from a quasi-solid electrolyte, which is a hybrid of the above described solid-state electrolyte systems a non-aqueous liquid electrolyte solution. For example, in certain variations, the plurality of separators 60A, 60B, 60C may comprise greater than or equal to about 0 wt. % to less than or equal to about 50 wt. %, and in certain aspects, optionally greater than or equal to about 1 wt. % to less than or equal to about 10 wt. %, of the non-aqueous liquid electrolyte solution. Numerous conventional non-aqueous liquid electrolyte solutions may be employed. The non-aqueous liquid electrolyte solution includes a lithium salt dissolved in an organic solvent or a mixture of organic solvents. Appropriate lithium salts generally have inert anions.

A non-limiting list of lithium salts that may be dissolved in an organic solvent or a mixture of organic solvents to form the non-aqueous liquid electrolyte solution include lithium hexafluorophosphate (LiPF$_6$); lithium perchlorate (LiClO$_4$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium difluorooxalatoborate (LiBF$_2$(C$_2$O$_4$)) (LiODFB), lithium tetraphenylborate (LiB(C$_6$H$_5$)$_4$), lithium bis-(oxalate)borate (LiB(C$_2$O$_4$)$_2$) (LiBOB), lithium tetrafluorooxalatophosphate (LiPF$_4$(C$_2$O$_4$)) (LiFOP), lithium nitrate (LiNO$_3$), lithium hexafluoroarsenate (LiAsF$_6$), lithium trifluoromethanesulfonate (LiCF$_3$SO$_3$), lithium bis(trifluoromethanesulfonimide) (LiTFSI) (LiN(CF$_3$SO$_2$)$_2$), lithium fluorosulfonylimide (LiN(FSO$_2$)$_2$) (LiFSI), and combinations thereof. In certain variations, the lithium salt is selected from lithium hexafluorophosphate (LiPF$_6$), lithium bis(trifluoromethanesulfonimide) (LiTFSI) (LiN(CF$_3$SO$_2$)$_2$), lithium fluorosulfonylimide (LiN(FSO$_2$)$_2$) (LiFSI), and combinations thereof.

These and other similar lithium salts may be dissolved in a variety of organic solvents, including but not limited to various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethyl methyl carbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane (DME), 1-2-diethoxyethane, ethoxymethoxyethane), cyclic ethers (e.g., tetrahydrofuran, 2-methyltetrahydrofuran), 1,3-dioxolane (DOL)), sulfur compounds (e.g., sulfolane), and combinations thereof. In various aspects, the electrolyte 100 may include greater than or equal to 1 M to less than or equal to about 2 M concentration of the one or more lithium salts. In certain variations, for example when the electrolyte has a lithium concentration greater than about 2 M of ionic liquids, the electrolyte 100 may include one or more diluters, such as fluoroethylene carbonate (FEC) and/or hydrofluoroether (HFE).

The skilled artisan will appreciate that the first separator 60A may be the same as or different from the second separator 60B and/or the third separator 60C. Likewise, the second separator 60A may be the same as or different from the first separator 60A and/or the third separator 60C; and the third separator 60C may be the same or different from the first separator 60A and/or the second separator 60B.

With renewed reference to FIG. 1A, in various aspects, the positive outer electrode 22 may be a bilayer structure. For example, the positive outer electrode 22 may have a first positive electroactive layer 24 disposed in electrical communication with a first positive current collector 28. For example, the first positive electroactive layer 24 may be disposed on or adjacent one or more parallel surfaces of the first positive current collector 28. As illustrated, the first positive electroactive layer 24 may be disposed on or adjacent a first surface 27 of the first positive current collector 28. The first surface 27 of the first positive current collector 28 may face the negative outer electrode 30. For example, the first surface 27 of the first positive current collector 28 may face a first surface 37 of a first negative current collector 36.

The negative outer electrode 30 may also have a bilayer structure. For example, the negative outer electrode 30 may comprise a first negative electroactive layer 34 disposed in electrical communication with a first negative current collector 36. For example, the first negative electroactive layer 34 may be disposed on or adjacent one or more parallel surfaces of the first negative current collector 36. As illustrated, the first negative electroactive layer 34 may be disposed on or adjacent a first surface 37 of the first negative current collector 36. The first surface 37 of the first negative current collector 36 faces the first outer electrode 22. For example, the first surface 37 of the first negative current collector 36 may face the first surface 27 of the first positive current collector 28.

The monopolar electrodes 26A, 26B may each have a trilayer structure. For example, each monopolar electrode 26A, 26B comprises an additional current collector and one or more additional electroactive layers disposed in electrical communication with the additional current collector. The at least two monopolar electrodes 26A, 26B may comprises a first or negative monopolar electrode 26A and a second or positive monopolar electrode 26B. The negative monopolar electrode 26A includes a second negative current collector 40 and one or more negative electroactive layers 46, 48 disposed in electrical communication with the second negative current collector 40. As illustrated, a second negative electroactive layer 46 may be disposed on or adjacent a first surface 42 of the second negative current collector 40. The first surface 42 of the second negative current collector 40 may face the positive outer electrode 22. A third negative electroactive layer 48 may be disposed on or adjacent a second surface 44 of the second negative current collector 40. The first surface 42 of the second negative current collector 40 may be parallel with the second surface 44 of the second negative current collector 40. The second surface 44 of the second negative current collector 40 may face the negative outer electrode 30.

The positive monopolar electrode 26B comprises a second positive current collector 50 and one or more positive electroactive layers 56, 58 disposed in electrical communication with the second positive current collector 50. As illustrated, a second positive electroactive layer 56 may be disposed on or adjacent a first surface 52 of the second positive current collector 50. The first surface 52 of the second positive current collector 50 may face the positive outer electrode 22. A third positive electroactive layer 58 may be disposed on or adjacent a second surface 54 of the second positive current collector 50. The first surface 52 of the second positive current collector 50 may be parallel with the second surface 54 of the second positive current collector 50. The second surface 54 of the second positive current collector 50 may face the negative outer electrode 30.

In various instances, each of the first positive electroactive layer 24, the second positive electroactive layer 56, and the third positive electroactive layer 58 comprises a lithium-based positive electroactive material that is capable of undergoing lithium intercalation and deintercalation, alloying and dealloying, or plating and stripping, while functioning as a positive terminal of the electrochemical cell 20. The first positive electroactive layer 24 may be comprise the same or different lithium-based positive electroactive material as the second positive electroactive layer 56 and/or the third positive electroactive layer 58. Likewise, the second positive electroactive layer 56 may be comprise the same or different lithium-based positive electroactive material as the first positive electroactive layer 24 and/or the third positive electroactive layer 58; and the third positive electroactive layer 58 may be comprise the same or different lithium-based positive electroactive material as the first positive electroactive layer 24 and/or the second positive electroactive layer 56.

For example, each of the first positive electroactive layer 24, the second positive electroactive layer 56, and the third positive electroactive layer 58 may be defined by a plurality of one or more positive electroactive particles (not shown) comprising one or more transition metal cations, such as manganese (Mn), nickel (Ni), cobalt (Co), chromium (Cr), iron (Fe), vanadium (V), and combinations thereof. Independent pluralities of such positive electroactive particles may be disposed in one or more layers to define the three-dimensional structures of the first positive electroactive layer 24, the second positive electroactive layer 56, and the third positive electroactive layer 58. In certain variations, the first positive electroactive layer 24, the second positive electroactive layer 56, and the third positive electroactive layer 58 may further include an electrolyte, for example a plurality of solid-state electrolyte particles (not shown). The solid-state electrolyte particles within the first positive electroactive layer 24, the second positive electroactive layer 56, and/or the third positive electroactive layer 58 may be the same or different from the solid-state electrolyte particles that form the plurality of separators 60A, 60B, 60C.

In various aspects, the first positive electroactive layer 24, the second positive electroactive layer 56, and/or the third positive electroactive layer 58 may each be one of a layered-oxide cathode, a spinel cathode, and a polyanion cathode. For example, layered-oxide cathodes (e.g., rock salt layered oxides) comprises one or more lithium-based positive electroactive materials selected from $LiCoO_2$ (LCO), $LiNi_xMn_yCo_{1-x-y}O_2$ (where $0 \leq x \leq 1$ and $0 \leq y \leq 1$), $LiNi_{1-x-y}Co_xAl_yO_2$ (where $0 \leq x \leq 1$ and $0 \leq y \leq 1$), $LiNi_xMn_{1-x}O_2$ (where $0 \leq x \leq 1$), and $Li_{1-x}MO_2$ (where M is one of Mn, Ni, Co, and Al and $0 \leq x \leq 1$). Spinel cathodes comprise one or more lithium-based positive electroactive materials selected from $LiMn_2O_4$ (LMO) and $LiNi_xMn_{1.5}O_4$. Olivine type cathodes comprise one or more lithium-based positive electroactive material $LiMPO_4$ (where M is at least one of Fe, Ni, Co, and Mn). Polyanion cations include, for example, a phosphate such as $LiV_2(PO_4)_3$ and/or a silicate such as $LiFeSiO_4$. In this fashion, the first positive electroactive layer 24, the second positive electroactive layer 56, and/or the third positive electroactive layer 58 may each (independently) include one or more lithium-based positive electroactive materials selected from the group consisting of: $LiCoO_2$ (LCO), $LiNi_xMn_yCo_{1-x-y}O_2$ (where $0 \leq x \leq 1$ and $0 \leq y \leq 1$), $LiNi_{1-x-y}Co_xAl_yO_2$ (where $0 \leq x \leq 1$), $LiNi_xMn_{1-x}O_2$ (where $0 \leq x \leq 1$), $Li_{1+x}MO_2$ where M is one of Mn, Ni, Co, Al and $0 \leq x \leq 1$), $LiMn_2O_4$ (LMO), $LiNi_xMn_{2-x}O_4$ (where $0 \leq x \leq 1$), $LiV_2(PO_4)_3$, $LiMSiO_4$ (where M is at least one of Fe and Mn), $LiMPO_4$ (where M is at least one of Fe, Ni, Co, and Mn), and combinations thereof.

In various aspects, the one or more lithium-based positive electroactive materials may be optionally coated (for example by $LiNbO_3$ and/or $Al_2O_3$) and/or may be doped (for example by magnesium (Mg)). Further, in certain variations, the one or more lithium-based positive electroactive materials may be optionally intermingled with—the first positive electroactive layer 24, the second positive electroactive layer 56, and/or the third positive electroactive layer 58 may optionally include—one or more electronically conductive materials that provide an electron conductive path and/or at least one polymeric binder material that improves the structural integrity of the respective electrode. For example, the first positive electroactive layer 24, the second positive electroactive layer 56, and/or the third positive electroactive layer 58 may each include greater than or equal to about 30 wt. % to less than or equal to about 98 wt. % of the one or more lithium-based positive electroactive materials; greater than or equal to about 0 wt. % to less than or equal to about 30 wt. % of electronically conductive materials; greater than or equal to about 0 wt. % to less than or equal to about 50 wt. % of one or more ionically conductive materials (e.g., one or more solid-state electrolytes); and greater than or equal to about 0 wt. % to less than or equal to about 20 wt. %, and in certain aspects, optionally greater than or equal to about 1 wt. % to less than or equal to about 20 wt. %, of a binder.

The first positive electroactive layer 24, the second positive electroactive layer 56, and/or the third positive electroactive layer 58 may optionally include binders such as poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (NaPAA), sodium alginate, lithium alginate, and combinations thereof. Electronically conductive materials may include carbon-based materials, powder nickel or other metal particles, or a conductive polymer. Carbon-based materials may include, for example, particles of carbon black, graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like.

The first and second positive current collectors 28, 50 may facilitate the flow of electrons between the electrodes 22, 26B and an exterior circuit. For example, an interruptible external circuit and a load device may connect the positive outer electrode 22 (through the first positive current collector 28) and the positive monopolar electrode 26A (through the second positive current collector 50). The positive current collectors 28, 50 may include metal, such as a metal foil, a metal grid or screen, or expanded metal. For example, the positive current collectors 28, 50 may be formed from aluminum and/or nickel or any other appropriate electronically conductive materials known to those of skill in the art. In various aspects, the first and second positive current collectors 28, 50 may be the same or different.

In various aspects, each of the first negative electroactive layer 34, the second negative electroactive layer 46, and the third negative electroactive layer 48 comprises a lithium host material (e.g., negative electroactive material) that is capable of functioning as a negative terminal of the electrochemical cell 20. The first negative electroactive layer 34 may be comprise the same or different negative electroactive material as the second negative electroactive layer 46 and/or the third negative electroactive layer 48. Likewise, the second negative electroactive layer 46 may be comprise the same or different negative electroactive material as the first negative electroactive layer 34 and/or the third negative electroactive layer 48; and the third negative electroactive layer 48 may be comprise the same or different negative electroactive material as the first negative electroactive layer 34 and/or the second negative electroactive layer 46.

For example, each of the first negative electroactive layer 34, the second negative electroactive layer 46, and/or the third negative electroactive layer 48 may be defined by a plurality of one or more negative electroactive particles (not shown). Independent pluralities of one or more negative electroactive particles may be disposed in one or more layers to define the three-dimensional structures of the first negative electroactive layer 34, the second negative electroactive layer 46, and/or the third negative electroactive layer 48. In certain variations, the first negative electroactive layer 34, the second negative electroactive layer 46, and/or the third negative electroactive layer 48 may further include an electrolyte, for example a plurality of solid-state electrolyte particles (not shown). The solid-state electrolyte particles within the first negative electroactive layer 34, the second negative electroactive layer 46, and/or the third negative electroactive layer 48 may be the same or different from the solid-state electrolyte particles that form the plurality of separators 60A, 60B, 60C and/or the solid-state electrolyte particles present in the first positive electroactive layer 24, the second positive electroactive layer 56, and/or the third positive electroactive layer 58.

In certain variations, the negative solid-state electroactive particles 50 may be lithium-based comprising, for example, a lithium metal and/or lithium alloy. In other variations, the negative solid-state electroactive particles 50 may be silicon-based, comprising silicon, for example, a silicon alloy, silicon oxide, or combinations thereof that may be further mixed, in certain instances, with graphite. In still other variations, the negative solid-state electroactive particles 50 may be carbonaceous-based comprising one or more of graphite, graphene, carbon nanotubes (CNTs), and combinations thereof. In still further variations, the negative solid-state electroactive particles 50 may comprise lithium titanium oxide ($Li_4Ti_5O_{12}$) and/or one or more transition metals (such as tin (Sn)), one or more metal oxides (such as vanadium oxide ($V_2O_5$), tin oxide (SnO), titanium dioxide ($TiO_2$)), titanium niobium oxide ($Ti_xNb_yO_z$, where $0 \leq x \leq 2$, $0 \leq y \leq 24$, and $0 \leq z \leq 64$), and one or more metal sulfides (such as iron sulfide (FeS) and/or titanium sulfide ($TiS_2$)). In this fashion, the first negative electroactive layer 34, the second negative electroactive layer 46, and/or the third negative electroactive layer 48 may each (independently) include a negative electroactive material selected from the group consisting of: lithium metal, lithium alloy, silicon (Si), silicon alloy, silicon oxide, activated carbon (AC), hard carbon (HC), soft carbon (SC), graphite, graphene, carbon nanotubes, lithium titanium oxide ($Li_4Ti_5O_{12}$), tin (Sn), vanadium oxide ($V_2O_5$), titanium dioxide ($TiO_2$), titanium niobium oxide ($Ti_xNb_yO_z$, where $0 \leq x \leq 2$, $0 \leq y \leq 24$, and $0 \leq z \leq 64$), ferrous sulfide (FeS), titanium sulfide ($TiS_2$), lithium titanium silicate ($Li_2TiSiO_5$), and combinations thereof.

In various aspects, the one or more negative electroactive materials may be optionally intermingled with—the first negative electroactive layer 34, the second negative electroactive layer 46, and/or the third negative electroactive layer 48 may optionally include—one or more electronically conductive materials that provide an electron conductive path and/or at least one polymeric binder material that improves the structural integrity of the electrodes. For example, the first negative electroactive layer 34, the second negative electroactive layer 46, and/or the third negative electroactive layer 48 may each include greater than or equal to about 0 wt. % to less than or equal to about 99 wt. % of the negative electroactive material; greater than or equal to about 0 wt. % to less than or equal to about 30 wt. % of electronically conductive materials; greater than or equal to about 0 wt. % to less than or equal to about 50 wt. % of one or more ironically conductive materials (e.g., one or more solid-state electrolyte materials); and greater than or equal to about 0 wt. % to less than or equal to about 20 wt. %, and in certain aspects, optionally greater than or equal to about 1 wt. % to less than or equal to about 20 wt. % of a binder.

The first negative electroactive layer 34, the second negative electroactive layer 46, and/or the third negative electroactive layer 48 may optionally include binders such as poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (NaPAA), sodium alginate, lithium alginate, and combinations thereof. Electronically conductive materials may include carbon-based materials, powder nickel or other metal particles, or a conductive polymer. Carbon-based materials may include, for example, particles of carbon black, graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like.

The first and second negative current collectors 36, 40 may facilitate the flow of electrons between the electrodes 26A, 30 and an exterior circuit. For example, an interruptible external circuit and a load device may connect the negative outer electrode 36 (through the first negative current collector 36) and the negative monopolar electrode 26B (through the second negative current collector 40). The negative current collectors 36, 40 may include metal, such as a metal foil, a metal grid or screen, or expanded metal. For example, the negative current collectors 36, 40 may be formed from copper or any other appropriate electronically conductive material known to those of skill in the art.

In various instances, as noted above, at least one of the at least two monopolar electrodes 26A, 26B includes one or more capacitor additives. For example, in certain variations, one of the negative electroactive layers 46, 48 may comprise the one or more capacitor additives. In other variations, one of the positive electroactive layers 56, 58 comprise the one or more capacitor additives. In various aspects, for example when the capacitor-containing electrodes consists essentially of the one or more capacitor additives, the number of capacitor-containing electrodes in an electrochemical cell 20 may be greater than or equal to about 1 to less than or equal to about n−1, where n is the total number of electroactive layers in the battery. As illustrated, the positive monopolar electrode 26B may comprise the one or more capacitor additives. For example, the second positive electroactive layer 56 may comprise greater than or equal to about 0.1 wt. % to less than or equal to about 100 wt. %, optionally greater than or equal to about 1 wt. % to less than or equal to about 100 wt. %, and in certain aspects, about 3 wt. %, of the one or more capacitor additives. In other aspects, the second positive electroactive layer 56 may be a capacitor layer consisting essentially of the one or more capacitor additives.

In each instance, the one or more capacitor additives may comprise one or more porous carbonaceous material, such as activated carbons (ACs), carbon xerogels, carbon nanotubes (CNTs), mesoporous carbons, templated carbons, carbide-derived carbons (CDCs), graphene, porous carbon spheres, and heteroatom-doped carbon materials. In other instances, the one or more capacitor additives may comprise one or more faradaic capacitor materials, such as noble metal oxides (for example $RuO_2$), transition metal oxides/hydroxides (for example $MnO_2$, NiO, $Co_3O_4$, $Co(OH)_2$, and $Ni(OH)_2$), conducting polymers (for example polyaniline (PANT), polypyrrole (PPY), and polythiophene (PTh)). In this fashion, the one or more capacitor additives may selected from the group consisting of: activated carbons (ACs), carbon xerogels, carbon nanotubes (CNTs), mesoporous carbons, templated carbons, carbide-derived carbons (CDCs), graphene, porous carbon spheres, heteroatom-doped carbon materials, ruthenium oxide ($RuO_2$), manganese oxide ($MnO_2$), nickel oxide (NiO), cobalt oxide ($Co_3O_4$), cobalt hydroxide ($Co(OH)_2$), nickel hydroxide $Ni(OH)_2$, polyaniline (PANT), polypyrrole (PPY), and polythiophene (PTh), and combinations thereof.

Figure 1B:
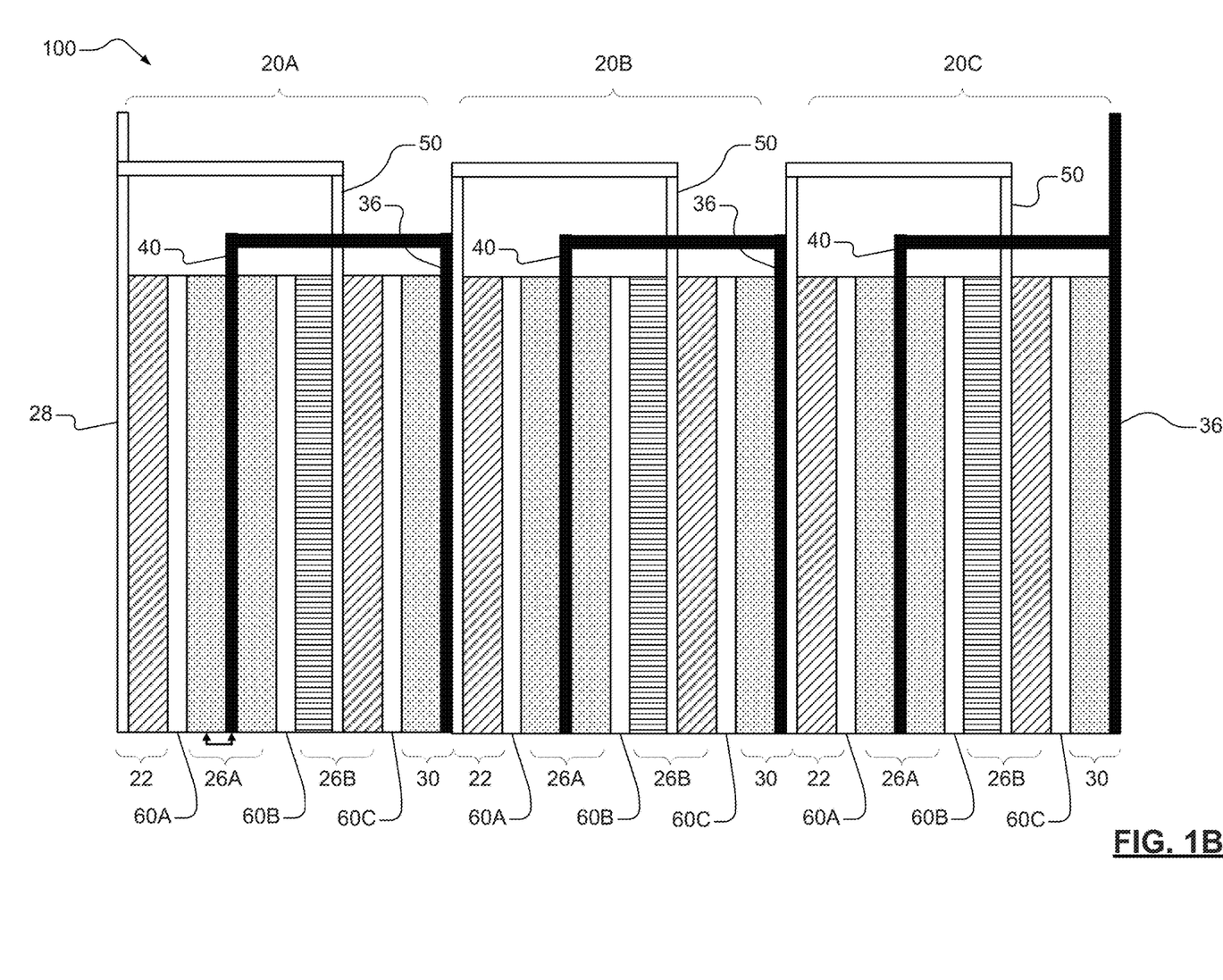
FIG. 1B is an example schematic illustration of a hybrid electrochemical device comprising at least two solid-state electrochemical cells like those illustrated in FIG. IA, where the at least two solid-state electrochemical cells are electrically connected in series to form a battery pack in accordance with various aspects of the present disclosure.

As noted, often batteries or cells may be electrically connected in a stack to increase overall output. For example, FIG. 1B is an example schematic As illustration of a hybrid electrochemical device comprising solid-state electrochemical cells comprising one or more capacitor additives or materials and having a parallel configuration, like those illustrated in FIG. 1A, that are connected in series to form a stack 100. In various aspects, two or more electrochemical cells, for example electrochemical cells like electrochemical cell 20 illustrated in FIG. 1A, may be configured in series to form the stack 100. For example, as illustrated, the stack 100 may include three electrochemical cells 20A, 20B, 20C in series. In various aspects, the electrochemical cells 20A, 20B, 20C may be the same or different. The integration of the higher capacity parallel electrical configuration of the electrochemical cells 20A, 20B, 20C (e.g., second level connection) with the higher voltage series electrical configuration of the stack 100 (e.g., first level connection) enables a cell having both improved voltage and capacity capabilities.

In various aspects, the embodiments shown in FIGS. 1A and 1B are representative, but not necessarily limiting, of electrochemical cells comprising one or more capacitor materials and having parallel electrical configurations and/or stacks having series electrical configurations. The electrochemical cells and stacks may be employed in other design configurations to provide the solid-state electrochemical device. For example, the skilled artisan will appreciate the capacitor additive or material may be incorporated into one or more other electroactive layers and that the details illustrated in FIGS. 1A and 1B extend also to various cell and stack configurations, for example stack configurations incorporating additional electrochemical cells.

Figure 2A:
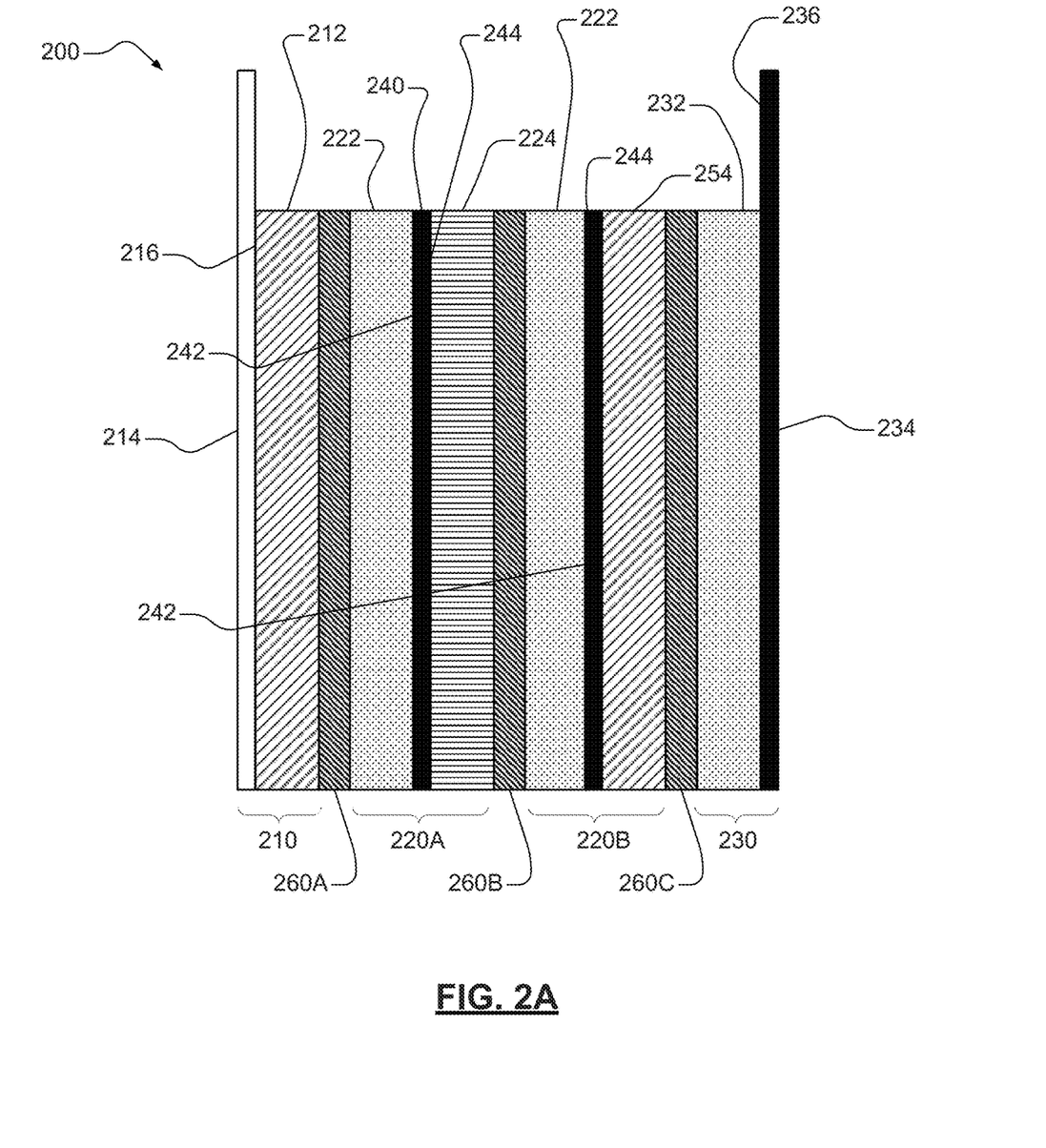
FIG. 2A is an example schematic illustration of a solid-state electrochemical cell having a serial configuration and at least one electrode comprising a capacitor additive in accordance with various aspects of the present disclosure.

Another exemplary and schematic illustration of a capacitor-assisted, solid-state electrochemical cell 200 is shown in FIG. 2A. The electrochemical cell 200 has a series configuration. For example, the electrochemical cell 200 may include outer electrodes 210, 230 that define the perimeter of the electrochemical cell 200 and a plurality of bipolar electrodes 220A, 220B disposed between the outer electrodes 210, 230. As illustrated, the electrochemical cell 200 may comprise a positive outer electrode 210 and a negative outer electrode 230 and at least two bipolar electrodes 220A, 220B disposed therebetween. One of the at least two bipolar electrodes 220A, 220B may comprise one or more capacitor additives. For example, as illustrated, a second layer 224 of the first bipolar electrode 220A may comprise the one or more capacitor additives. The electrochemical cell 200 also includes a plurality of separators 260A, 260B, 260C that are disposed between the electrodes 210, 220A, 220B, 230. The separators 260A, 260B, 260C provide electrical separation—preventing physical contact—between the electrodes 210, 220A, 220B, 230. The separators 260A, 260B, 260C also provide a minimal resistance paths for internal passage of ions. For example, a first separator 260A may be disposed between the positive outer electrode 210 and a first bipolar electrode 220A. A second separator 260B may be disposed between the first bipolar electrode 220A and the second bipolar electrode 220B. A third separator 260C may be disposed between the second bipolar electrode 220B and the negative outer electrode 230.

Similar to separators 260A, 260B, 260C illustrated in FIGS. 1A and 1B, the separators 260A, 260B, and 260C may each be formed by solid-state electrolytes. For example, the separators 260A, 260B, 260C may each include individual pluralities of one or more solid-state electrolyte particles (not shown). Each plurality of solid-state electrolyte particles may be disposed in one or more layers or composites so as to define a three-dimensional structure of respective separator 260A, 260B, 260C. In certain variations, the separators 260A, 260B, 260C may comprise a quasi-solid electrolyte. For example, in certain variations, the plurality of separators 260A, 260B, 260C may comprise greater than or equal to about 0 wt. % to less than or equal to about 50 wt. %, and in certain aspects, optionally greater than or equal to about 1 wt. % to less than or equal to about 10 wt. %, of the non-aqueous liquid electrolyte solution. The skilled artisan will appreciate that the first separator 260A may be the same as or different from the second separator 260B and/or the third separator 260C. Likewise, the second separator 260A may be the same as or different from the first separator 260A and/or the third separator 260C; and the third separator 260C may be the same or different from the first separator 260A and/or the second separator 260B.

With renewed reference to FIG. 2A, in various aspects, the positive outer electrode 210 may have a bilayer structure. For example, the positive outer electrode 210 may have a positive electroactive layer 212 disposed in electrical communication with a positive current collector 214. For example, the positive electroactive layer 212 may be disposed on or adjacent one or more parallel surfaces of the positive current collector 214. As illustrated, the positive electroactive layer 212 may be disposed on or adjacent a first surface 216 of the positive current collector 214. The first surface 316 of the positive current collector 214 may face the negative outer electrode 230. For example, the first surface 316 of the positive current collector 214 may face a first surface 236 of a first negative current collector 234.

The negative outer electrode 230 may also have a bilayer structure. For example, the negative outer electrode 230 may comprise a negative electroactive layer 232 disposed in electrical communication with a first negative current collector 234. For example, the negative electroactive layer 232 may be disposed on or adjacent one or more parallel surfaces of the first negative current collector 234. As illustrated, the negative electroactive layer 232 may be disposed on or adjacent the first surface 236 of the first negative current collector 234. The first surface 236 of the first negative current collector 234 faces the first outer electrode 210. For example, the first surface 236 of the first negative current collector 234 may face the first surface 216 of the positive current collector 214.

The bipolar electrodes 220A, 220B may each have a trilayer structure. For example, each bipolar electrode 220A comprises a first bipolar current collector 240 and one or more electroactive layers 222, 224 disposed in electrical communication with the first bipolar current collector 240. As illustrated, a first electroactive layer 222 may be disposed on or adjacent a first surface 242 of the second negative current collector 40. The first surface 242 of the second negative current collector 40 may face the positive outer electrode 210. A second electroactive layer 224 may be disposed on or adjacent a second surface 244 of the second negative current collector 40. The first surface 242 of the second negative current collector 40 may be parallel with the second surface 244 of the second negative current collector 40. The second surface 244 of the second negative current collector 40 may face the negative outer electrode 230.

The first electroactive layer 222, which opposes the positive outer electrode 210, may be capable of functioning as a negative terminal of the electrochemical cell 200. For example, the negative electroactive layer 232 may be a first negative electroactive layer 232 and the first electroactive layer 222 of each bipolar electrode 220A, 220B may be a second negative electroactive layer 222. The negative electroactive layers 222, 232 may be defined by independent pluralities of one or more negative electroactive material particles (not shown). For example, a first plurality of negative electroactive material particles may be disposed in one or more layers to define the three-dimensional structures of the first negative electroactive layer 232. A second plurality of negative electroactive material particles may be disposed in one or more layers to define the three-dimensional structures of the second negative electroactive layer 222.

In each instance, similar to the first negative electroactive layer 34, the second negative electroactive layer 46, and/or the third negative electroactive layer 48 illustrated in FIGS. 1A and 1B, the negative electroactive material particles may include one or more negative electroactive material selected from the group consisting of: lithium metal, lithium alloy, silicon (Si), silicon alloy, silicon oxide, activated carbon (AC), hard carbon (HC), soft carbon (SC), graphite, graphene, carbon nanotubes, lithium titanium oxide ($Li_4Ti_5O_{12}$), tin (Sn), vanadium oxide ($V_2O_5$), titanium dioxide ($TiO_2$), titanium niobium oxide ($Ti_xNb_yO_z$, where $0\leq x\leq 2$, $0\leq y\leq 24$, and $0\leq z\leq 64$), ferrous sulfide (FeS), titanium sulfide ($TiS_2$), lithium titanium silicate ($Li_2TiSiO_5$), and combinations thereof. In various aspects, the negative electroactive material particles disposed to form the first negative electroactive layer 232 may be the same or different from the negative electroactive material particles disposed to form the second negative electroactive layer 222.

The second electroactive layer 224, 254, which opposes the negative outer electrode 230, comprises a lithium-based positive electroactive material that is capable of undergoing lithium intercalation and deintercalation, alloying and dealloying, or plating and stripping, while functioning as a positive terminal of the electrochemical cell 200. For example, the positive electroactive layer 212 may be a first positive electroactive layer 212 and the second electroactive layer 224, 254 of each bipolar electrode 220A, 220B may be a second positive electroactive layer 224, 254. The positive electroactive layers 212, 224, 254 may be defined by independent pluralities of one or more positive electroactive material particles (not shown). For example, a first plurality of positive electroactive material particles may be disposed in one or more layers to define the three-dimensional structures of the first positive electroactive layer 212. A second plurality of negative electroactive material particles may be disposed in one or more layers to define the three-dimensional structures of the second positive electroactive layer 224, 254.

In each instance, similar to the first positive electroactive layer 24, the second positive electroactive layer 56, and the third positive electroactive layer 58 illustrated in FIGS. 1A and 1B, the positive electroactive material particles may include one or more positive electroactive material selected from the group consisting of: $LiCoO_2$ (LCO), $LiNi_xMn_yCo_{1-x-y}O_2$ (where $0\leq x\leq 1$ and $0\leq y\leq 1$), $LiNi_{1-x-y}Co_xAl_yO_2$ (where $0\leq x\leq 1$ and $0\leq y\leq 1$), $LiNi_xMn_{1-x}O_2$ (where $0\leq x\leq 1$), $Li_{1+x}MO_2$ (where M is one of Mn, Ni, Co, Al and $0\leq x\leq 1$), $LiMn_2O_4$ (LMO), $LiNi_xMn_{2-x}O_4$ (where $0\leq x\leq 1$), $LiV_2(PO_4)_3$, $LiMSiO_4$ (where M is at least one of Fe and Mn), $LiMPO_4$ (where M is at least one of Fe, Ni, Co, and Mn), and combinations thereof. In various aspects, the positive electroactive material particles disposed to form the first positive electroactive layer 212 may be the same or different from the positive electroactive material particles disposed to form the second positive electroactive layer 224, 254.

In various aspects, similar to the positive current collectors 28, 50 illustrated in FIGS. 1A and 1B, the positive current collector 214 may include metal, such as a metal foil, a metal grid or screen, or expanded metal. For example, the positive current collector 214 may be formed from aluminum and/or nickel or any other appropriate electronically conductive materials known to those of skill in the art. Likewise, similar to the negative current collectors 36, 40 illustrated in FIGS. 1A and 1B, the negative current collector 234 may include metal, such as a metal foil, a metal grid or screen, or expanded metal. For example, the negative current collectors may be formed from copper or any other appropriate electronically conductive material known to those of skill in the art. The bipolar current collector 240 may also include metal, such as a metal foil, a metal grid or screen, or expanded metal. For example, the bipolar current collector 240 may comprise one or more materials selected from aluminum (Al), nickel (Ni), titanium (Ti), stainless, and combinations. In other variations, the bipolar current collector 240 may be a cladded bilayer foil.

In various instances, as noted above, at least one of the at least two bipolar electrodes 220A, 220B includes one or more capacitor additives. For example, as illustrated, the second electroactive layer 224 of the first bipolar electrode 220A may comprise the one or more capacitor additives. For example, the second electroactive layer 224 of the first bipolar electrode 220A may comprise greater than or equal to about 0.1 wt. % to less than or equal to about 100 wt. %, optionally greater than or equal to about 1 wt. % to less than or equal to about 100 wt. %, and in certain aspects, about 3 wt. %, of the one or more capacitor additives. In other aspects, the second electroactive layer 224 bipolar electrode 220A may be a capacitor layer consisting essentially of the one or more capacitor additives. In various aspects, for example when the capacitor-containing electrodes consists essentially of the one or more capacitor additives, the number of capacitor-containing electrodes in an electrochemical cell 200 may be greater than or equal to about 1 to less than or equal to about n−1, where n is the total number of electroactive layers in the battery.

Figure 2B:
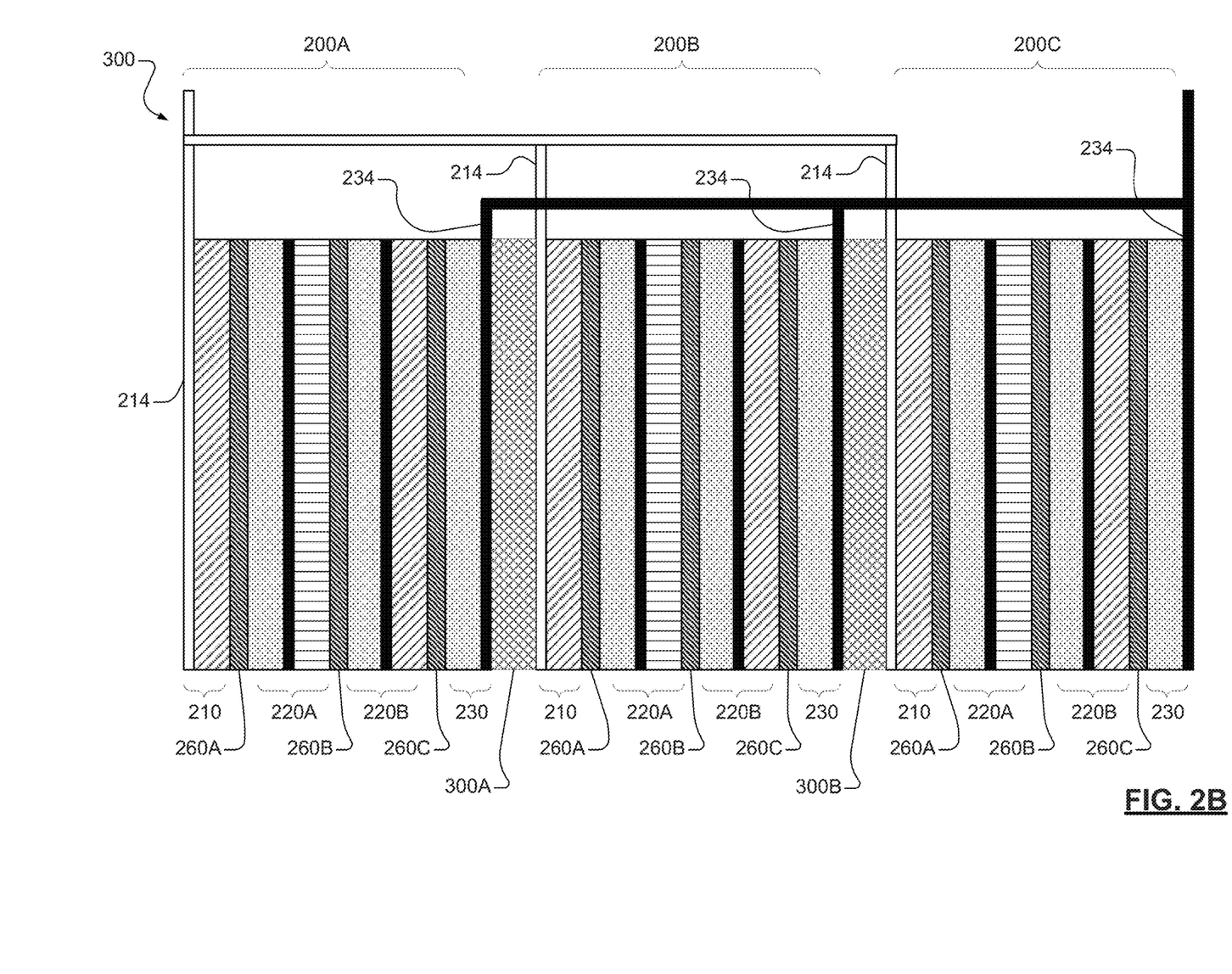
FIG. 2B is an example schematic illustration of a hybrid electrochemical device comprising at least two solid-state electrochemical cells like those illustrated in FIG. 2A, where the at least two solid-state electrochemical cells are electrically connected in series to form a battery pack in accordance with various aspects of the present disclosure.
Figure 2C:
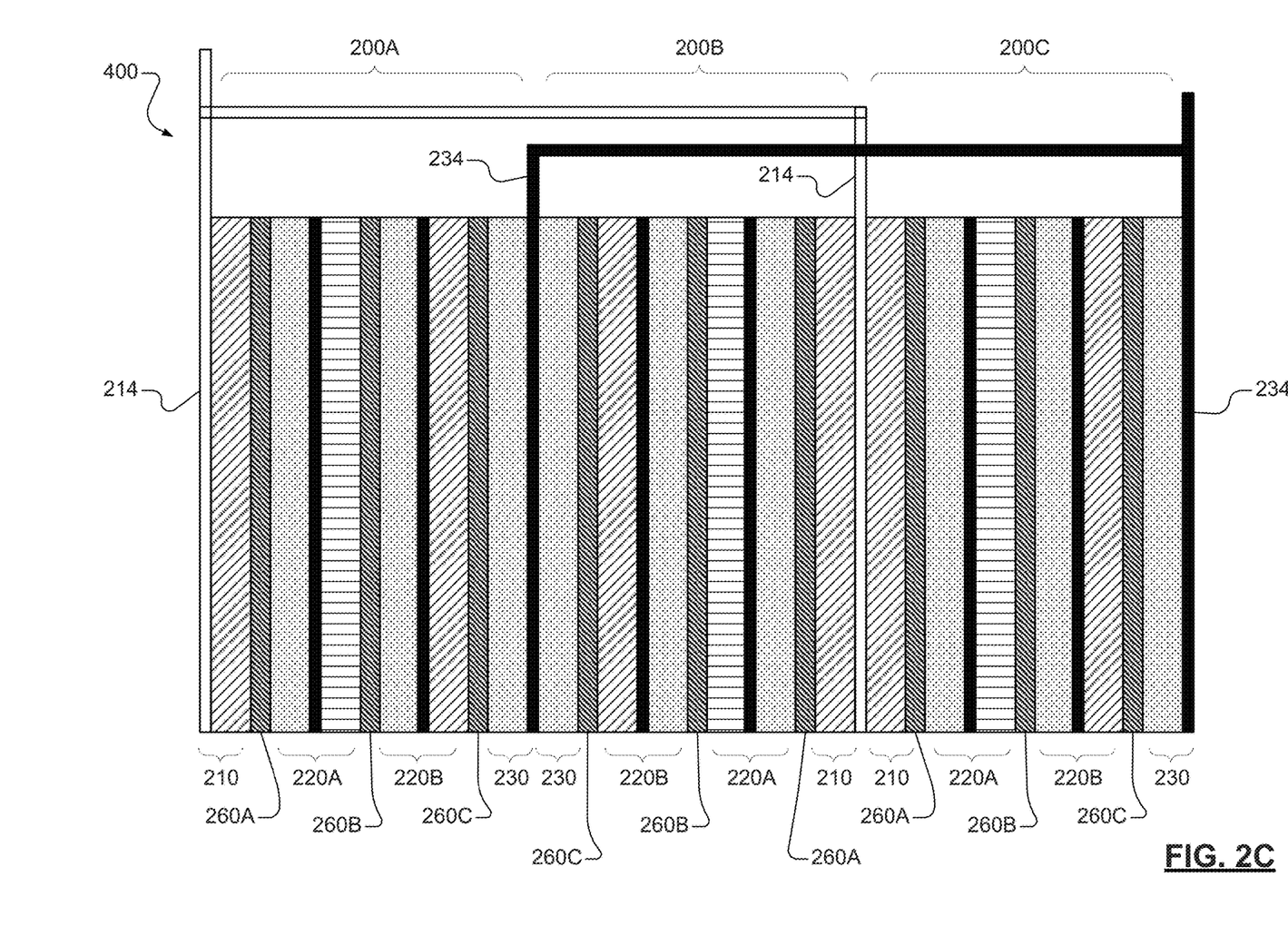
FIG. 2C is another example schematic illustration of a hybrid electrochemical device comprising at least two solid-state electrochemical cells like those illustrated in FIG. 2A, where the at least two solid-state electrochemical cells are electrically connected in series to form a battery pack in accordance with various aspects of the present disclosure.

As noted, often batteries or cells may be electrically connected in a stack to increase overall output. For example, FIGS. 2B and 2C are example schematic illustrations of hybrid electrochemical devices comprising solid-state electrochemical cells comprising one or more capacitor additives or materials and having a series configuration, like those illustrated in FIG. 2A, that are connected in parallel to form stacks 300, 400. In various aspects, two or more electrochemical cells, for example electrochemical cells like electrochemical cell 200 illustrated in FIG. 2A, may be configured in series to form the stacks 300, 400. For example, as illustrated, the stacks 300, 400 may each include three electrochemical cells 200A, 200B, 200C in parallel. In various aspects, the electrochemical cells 200A, 200B, 200C may be the same or different.

In various aspects, as illustrated in FIG. 2B, insulation layers 300A, 300B may be disposed between electrochemical cells, like those illustrated in FIG. 2A, that are electrically connected in parallel to form a stack 300 to limit short cycling within the stack. For example, a first insulation layer 300A may be disposed between a first electrochemical cell 200A and a second electrochemical cell 200B, and second installation layer 300B may be disposed between the second electrochemical cell 200B and a third electrochemical call 200C. In certain variations, the insulation layers 300A, 300B may be coated on one of the opposing outer electrodes. In such instances, the insulation layers 300A, 300B may comprise, for example, polyimide (PI), polyvinylidene fluoride (PVDF), polyether ether ketone (PEEK), polytetrafluoroethylene (PTFE), silicone, polyurethane, polypropylene (PP) and/or polyethylene (PE). In other variations, the insulation layers 300A, 300B may be a free-standing layer, for example a film or plate. In such instances, the insulation layers 300A, 300B may also comprise, for example, polyimide (PI), polyvinylidene fluoride (PVDF), polyether ether ketone (PEEK), polytetrafluoroethylene (PTFE), silicone, polyurethane, polypropylene (PP) and/or polyethylene (PE).

In other aspects, as illustrated in FIG. 2C, the electrochemical cells having series configurations, like those illustrated in FIG. 2A, a stack 300 may be formed having reduced integral short cycling using a parallel-alternative configuration. For example, as illustrated, a second electrochemical cell 200B disposed between a first electrochemical cell 200A and a third electrochemical cell 200C may have a reversed configuration. For example, the negative outer electrode 230 of the second electrochemical cell 200B may oppose the negative outer electrode 230 of the first electrochemical cell 200A; and the positive outer electrode 210 of the second electrochemical cell 200B may oppose the positive outer electrode 210 of the third electrochemical cell 200C. In such instances, the adjacent electrochemical cells 200A, 200B may share the same current collector 234. In certain aspects, an insulating layer may be removed to further improve the energy density of the battery.

In various aspects, the embodiments shown in FIGS. 2A-2C are representative, but not necessarily limiting, of electrochemical cells comprising one or more capacitor materials having series configurations and/or stacks having parallel configurations. The electrochemical cells and stacks may be employed in other design configurations to provide the solid-state electrochemical device. For example, the skilled artisan will appreciate the capacitor additive or material may be incorporated into one or more other electroactive layers and that the details illustrated in FIGS. 2A-2C extend also to various cell and stack configurations, for example stack configurations incorporating additional electrochemical cells.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hybrid electrochemical device comprising:
   at least two electrically connected solid-state electrochemical cells, wherein each solid-state electrochemical cell comprises:
     a first outer electrode comprising a first current collector and a first electroactive layer disposed on or adjacent a first surface of the first current collector;
     a second outer electrode comprising a second current collector and a second electroactive layer disposed on or adjacent a first surface of the second current collector; and
     one or more intervening electrodes disposed between the first and second electroactive layers, wherein at least one of the intervening electrodes comprises one or more capacitor additives,
   wherein the first outer electrode is electrically connected to at least one of the intervening electrodes in a first electrical configuration selected from series or parallel, the second outer electrode is electrically connected to at least one of the intervening electrodes in a second electrical configuration selected from series or parallel, and the at least two electrochemical cells are electrically connected in a third electrical configuration selected from series or parallel, wherein the first and second electrical configurations are the same and the third electrical configuration is distinct from the first and second electrical configurations.

2. The hybrid electrochemical device of claim 1, wherein the first and second electrical configurations are series configurations and the third electrical configuration is a parallel configuration.

3. The hybrid electrochemical device of claim 2, wherein the one or more intervening electrodes are bipolar electrodes and each of the bipolar electrodes comprises:
   a bipolar current collector having a first surface opposing a second surface;
   a positive electroactive layer disposed on or adjacent the first surface of the bipolar current collector; and
   a negative electroactive layer disposed on or adjacent the second surface of the bipolar current collector.

4. The hybrid electrochemical device of claim 3, wherein one of the positive electroactive layer and the negative electroactive layer of at least a first bipolar electrode comprises the one or more capacitor additives.

5. The hybrid electrochemical device of claim 3, wherein one of the positive electroactive layer and the negative electroactive layer of at least a first bipolar electrode is a capacitor layer consisting essentially of the one or more capacitor additives.

6. The hybrid electrochemical device of claim 5, wherein greater than or equal to about 1 to less than or equal to about n−1 of the intervening electrodes includes the one or more capacitor additives, where n is a total number of intervening electrodes in the solid-state electrochemical cell.

7. The hybrid electrochemical device of claim 1, wherein one of the first and second electroactive layers includes the one or more capacitor additives.

8. The hybrid electrochemical device of claim 1, wherein the first and second electrical configurations are parallel configurations and the third electrical configuration is a series configuration.

9. The hybrid electrochemical device of claim 1, wherein the one or more intervening electrodes are monopolar electrodes, wherein each monopolar electrode comprises:
   a third current collector having a first surface that opposes a second surface;
   a third electroactive layer disposed on or adjacent the first surface of the third current collector; and
   a fourth electroactive layer disposed on or adjacent the second surface of the third current collector.

10. The hybrid electrochemical device of claim 9, wherein one of the second and third electroactive layers includes the one or more capacitor additives.

11. The hybrid electrochemical device of claim 9, wherein one of the second and third electroactive layers consisting essentially of the one or more capacitor additives, and wherein greater than or equal to about 1 to less than or equal to about n−1 of the intervening electrodes includes the one or more capacitor additives, where n is a total number of intervening electrodes in the solid-state electrochemical cell.

12. The hybrid electrochemical device of claim 1, wherein a solid-state electrolyte is disposed between each of the positive outer electrode, the one or more intervening electrodes, and the negative outer electrode.

13. A hybrid electrochemical device comprising:
   at least two solid-state electrochemical cells, wherein the at least two solid-state electrochemical cells are electrically connected in series and wherein each of the at least two solid-state electrochemical cells comprises:
      a positive outer electrode comprising a first positive current collector and a first positive electroactive layer disposed on or adjacent a first surface of the first positive current collector;
      a negative outer electrode comprising a first negative current collector and a first negative electroactive layer disposed on or adjacent a first surface of the first negative current collector;
      at least one positive monopolar electrode disposed between the first positive electroactive layer and the first negative electroactive layer, wherein the at least one positive monopolar electrode is electrically connected to the positive outer electrode in parallel; and
      at least one negative monopolar electrode disposed with the at least one monopolar positive electrode between the first positive electroactive layer and the first negative electroactive layer, wherein the at least one negative monopolar electrode is electrically connected to the negative outer electrode in parallel, and wherein one of the at least one monopolar positive electrode and the at least one monopolar negative electrode comprises a capacitor additive.

14. The hybrid electrochemical device of claim 13, wherein each of the positive monopolar electrodes comprises:
   a second positive current collector having a first surface that opposes a second surface;
   a second positive electroactive layer disposed on the first surface of the second positive current collector; and
   a third positive electroactive layer disposed on the second surface of the second positive current collector; and
   each of the negative monopolar electrodes comprises:
      a second negative current collector having a first surface that opposes a second surface;
      a second negative electroactive layer disposed on or adjacent the first surface of the second negative current collector; and
      a third negative electroactive layer disposed on or adjacent the second surface of the second positive current collector.

15. The hybrid electrochemical device of claim 14, wherein the one of the second positive electroactive layer, the second negative electroactive layer, the third positive electroactive layer, and the third negative electroactive layer comprises the capacitor additive.

16. The hybrid electrochemical device of claim 14, wherein the one of the second positive electroactive layer, the second negative electroactive layer, the third positive electroactive layer, and the third negative electroactive layer is a capacitor layer consisting essentially of the capacitor additive.

17. A hybrid electrochemical device comprising:
   at least two solid-state electrochemical cells, wherein the at least two solid-state electrochemical cells are electrically connected in parallel and wherein each of the at least two solid-state electrochemical cells comprises:
      a positive outer electrode comprising a first positive current collector and a first positive electroactive layer disposed on or adjacent a first surface of the first positive current collector;
      a negative outer electrode comprising a first negative current collector and a first negative electroactive layer disposed on or adjacent a first surface of the first negative current collector; and
      at least two bipolar electrodes disposed between the first positive electroactive layer and the first negative electroactive layer, wherein one of the at least two bipolar electrodes comprises a capacitor additive.

18. The hybrid electrochemical device of claim 17, wherein each of the bipolar electrodes comprises:
   a bipolar current collector having a first surface opposing a second surface;
   a second positive electroactive layer disposed on or adjacent the first surface of the bipolar current collector; and
   a second negative electroactive layer disposed on or adjacent the second surface of the bipolar current collector.

19. The hybrid electrochemical device of claim 17, wherein a first bipolar electrode of the at least two bipolar electrodes comprise the capacitor additive.

20. The hybrid electrochemical device of claim 19, wherein a first bipolar electrode of the at least two bipolar electrodes comprises the capacitor additive, and
   wherein one of the second positive electroactive layer and the second negative electroactive layer of the first bipolar electrode is a capacitor layer consisting essentially of the capacitor additive.

* * * * *